No. 853,661. PATENTED MAY 14, 1907.
A. WALBRECKER.
LOCKING NUT.
APPLICATION FILED JAN. 5, 1907.

Witnesses
Max B. A. Doring
Frank Jordan

Inventor
Albert Walbrecker
By his Attorney
L. K. Sohn

THE NORRIS PETERS CO., WASHINGTON, D. C.

UNITED STATES PATENT OFFICE.

ALBERT WALBRECKER, OF ELBERFELD, GERMANY, ASSIGNOR TO CARL WÜLFING, JR., OF ELBERFELD, GERMANY.

LOCKING-NUT.

No. 853,661.     Specification of Letters Patent.     Patented May 14, 1907.

Application filed January 5, 1907. Serial No. 350,901.

*To all whom it may concern:*

Be it known that I, ALBERT WALBRECKER, a subject of the Emperor of Germany, and a resident of Elberfeld, Rhenish Prussia, Germany, have invented certain new and useful Improvements in Locking-Nuts, of which the following is a specification.

This invention relates to locking nuts, bolts or the like which has the advantage over known nut locks in that it avoids any weakening of the bolt and the locking device is of such construction that it operates in any position of the nut and exercises a clamping effect thereon, which is automatically increased by the strain on the nut.

Figure 1:
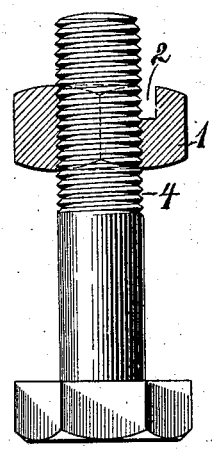
Figure 2:
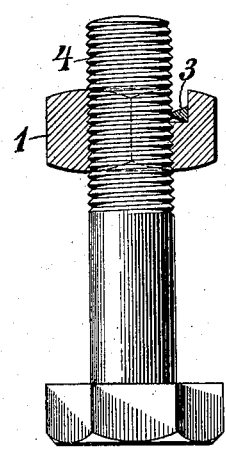
Figure 3:
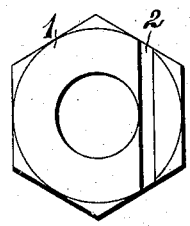
Figure 4:
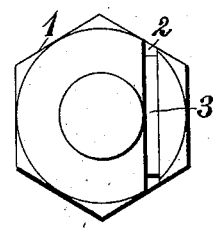
Figure 5:
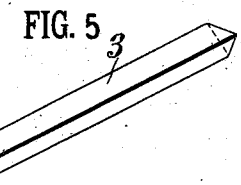

The invention is illustrated in the accompanying drawing in which;

Figures 1 and 2 are vertical side elevations partly in section showing each a screw bolt and nut which embodies my invention. Fig. 3 is a top plan view of the nut. Fig. 4 is a top plan view of the nut with the pin inserted, and Fig. 5 is a perspective view of the pin.

In carrying out this invention, the nut 1 is formed with a relatively deep recess or boring 2 tangential to the thread as shown into which a wedge shaped locking pin 3 of uniform diameter and shape throughout its entire length is inserted as shown in Fig. 1. in such a manner that the tapered front portion engages with the thread 4 of the screw bolt while the flat back of the pin bears against the surface of the recess 2. Hereby a clamping effect is obtained between the nut and the bolt which increases with the strain on the nut so that even a partial self loosening of the nut is impossible and before the nut could work loose the pin would have to be bent outward by the nut which however is impossible within the recess 2.

When there is a strain on the bolt and nut during use the locking pin is pressed more tightly in between the surface of the recess and two neighboring threads.

Having thus described my invention I claim as new and desire to secure by Letters Patent of the United States of America:

A locking nut and bolt consisting of a nut having a deep recess tangential to the thread of said nut, a threaded bolt, and a locking pin of uniform diameter and dimensions throughout its entire length and wedge shaped in cross section adapted to be inserted so that its flat back bears against the surface of said recess in the nut and the sharp edge of the wedge rests between the threads of the bolt whereby the locking effect of the device is increased by the strain thereon during use.

Signed at Barmen, Germany this 20th day of December 1906.

ALBERT WALBRECKER. [L. S.]

Witnesses:
   OTTO KÖNIG,
   J. A. RITTERSHAUS.